US007272381B2

(12) United States Patent
Aura (10) Patent No.: US 7,272,381 B2
(45) Date of Patent: Sep. 18, 2007

(54) MOBILE AUTHENTICATION SYSTEM WITH REDUCED AUTHENTICATION DELAY

(75) Inventor: Anssi Tuomas Aura, Cambridge (GB)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 11/097,492

(22) Filed: Apr. 1, 2005

(65) Prior Publication Data

US 2005/0172117 A1 Aug. 4, 2005

Related U.S. Application Data

(63) Continuation of application No. 10/090,999, filed on Mar. 4, 2002, now Pat. No. 6,947,725.

(51) Int. Cl.
*H04M 1/68* (2006.01)
(52) U.S. Cl. ............... 455/410; 455/436; 370/331
(58) Field of Classification Search ........... 455/436, 455/439; 370/331, 338
See application file for complete search history.

(56) References Cited

U.S. PATENT DOCUMENTS

| | | | |
|---|---|---|---|
| 6,788,660 B1* | 9/2004 | Agrawal et al. | 370/331 |
| 2003/0028649 A1* | 2/2003 | Uhlik et al. | 709/228 |
| 2003/0108007 A1* | 6/2003 | Holcman et al. | 370/331 |
| 2003/0176186 A1* | 9/2003 | Mohammed | 455/432.1 |
| 2004/0192211 A1* | 9/2004 | Gallagher et al. | 455/67.11 |

FOREIGN PATENT DOCUMENTS

EP 0 991 242 A2 4/2000

OTHER PUBLICATIONS

European Patent Office, "European Search Report", for European Patent Application No. 03003105.8, Examiner Chassatte, R., Sep. 27, 2005.

William H. Winsborough, Kent E. Seamons, Vicki E. Jones "Automated Trust Negotiation", DISCEX, Jan. 25, 2000, pp. 88-102, vol. 1.

Applied Cryptography, Protocols, Algorithms, and Source Code in C, Bruce Schneier, Second Edition, pp. 466-482, pp. 566-572, pp. 604-605, p. 722.

"Stateless Connections" by Tuomas Aura, Pekka Nikander, Helsinki University of Technology, FIN-02015 HUT, Finnland.

"Strategies Against Replay Attacks" by Tuomas Aura, Digital Systems Laboratory, Helsinki University of Technology, P.O. Box 1100, FIN 02015 HUT, Finland.

DOS-Resistant Authentication with Client Puzzles by Tuomas Aura, Pekka Nikander and Jussipelda Leiwo, Helsinki University of Technology, P.O. Box 5400, FIN-02015 HUT, Finland, and Vrije Universiteit, Division of Sciences De Boeiciaan 1081A, 1081 HV Amsterdam, The Netherlands.

* cited by examiner

*Primary Examiner*—Joseph Feild
*Assistant Examiner*—Phuoc Doan (57) ABSTRACT

Many examples exist of a mobile node moving between the operational zones of multiple network access points or base stations. To minimize delay in re-authenticating with the network through a new base station, an additional form authenticated access mode called "credential authenticated" access is provided. The mobile unit is fully authenticated in the first base station (e.g., the user has logged in and paid for service). Thereafter, the first base unit transmits a "credential" to the mobile node that may be used by other base stations to establish trust with the mobile node prior to full re-authentication. Upon entering the operational zone of the second base station, the mobile node can transmit the credential to the second base station, which may accept the credential and allow access by the mobile node to the network through the second base station before full authentication has completed.

21 Claims, 4 Drawing Sheets

MOBILE AUTHENTICATION SYSTEM WITH REDUCED AUTHENTICATION DELAY

RELATED APPLICATIONS

This is a continuation of U.S. patent application Ser. No. 10/090,999, filed Mar. 4, 2002, and entitled "Mobile Authentication System with Reduced Authentication Delay", which is hereby incorporated herein by this reference.

TECHNICAL FIELD

The invention relates generally to mobile communications, and more particularly to authentication of mobile access to one or more communications networks.

BACKGROUND

Interactive data connections, live video and multimedia are seen as core applications that drive the construction of future mobile access networks. A promise to the consumer is to be able to access the same services everywhere and to be able to move seamlessly from a home or office having a high-speed Internet connection to remote areas having only a narrowband wireless coverage. However, a major technical challenge in providing such services is the variable quality of service (QoS) provided by such mobile access networks. Particularly, network latency can make interactive services unusable and high variations in the latency (i.e., "jitter") can create problems for real-time services, such as video streaming.

One major source of network latency and jitter is introduced by security mechanisms. Most network operators charge for access to their networks. Therefore, it is typically desirable to fully authenticate a user before granting the user access to network services. Such authentication is termed "full authentication" herein and may include without limitation authentication through login validation, anonymous or non-anonymous verification of access authorization or previous payment, or acceptance of electronic or credit card payment for the access to the network.

Furthermore, when a wireless mobile user moves between network base stations of a network or of different networks, the user must be re-authenticated before access to the network is granted through the new network base station. Re-authentication may include, for example, confirming with an on-line accounting system or bank that the user has paid for services or is otherwise eligible to access the network. However, the significant delay introduced by this re-authentication operation at each base station is undesirable and decreases the QoS experienced by the mobile user. Furthermore, the complex cryptographic operations required of the mobile device in a full authentication scheme are slow on low-power processors, which are often used on mobile devices to conserve battery power.

In contrast, some existing networks do not require re-authentication to grant access. Instead, such networks provide so-called "optimistic service" before the user has been re-authenticated. That is, a user can gain access to the network during a reasonably short period of time prior to re-authentication. However, without some reliable but quick authentication, malicious users can take advantage of optimistic service schemes by generating a high volume of such optimistic service periods to get free service.

SUMMARY

Embodiments of the present invention solve the discussed problems by introducing an additional form authenticated access mode called "credential authenticated" access to reduce the service latency when a mobile unit moves between a first base station and a second base station. The mobile unit is fully authenticated in the first base station (e.g., the user has logged in and paid for service). Thereafter, the first base unit transmits a "credential" to the mobile node that may be used by other base stations to establish trust with the mobile node prior to full re-authentication. Upon entering the operational zone of the second base station, the mobile node can transmit the credential to the second base station, which may accept the credential and allow access by the mobile node to the network through the second base station before full authentication has completed. In this manner, the mobile node user experiences minimal service latency when moving between base stations.

In implementations of the present invention, articles of manufacture are provided as computer program products. One embodiment of a computer program product provides a computer program storage medium readable by a computer system and encoding a computer program that provides the mobile node with credential authenticated access to the network through the second base station prior to completion of full authentication of the mobile node by the second base station. Another embodiment of a computer program product may be provided in a computer data signal embodied in a carrier wave by a computing system and encoding the computer program that provides the mobile node with credential authenticated access to the network through the second base station prior to completion of full authentication of the mobile node by the second base station.

The computer program product encodes a computer program for executing on a computer system a computer process for providing the mobile node with credential authenticated access to the network through the second base station prior to completion of full authentication of the mobile node by the second base station. A network is coupled to a first base station and the second base station. The mobile node is fully authenticated by the first base station for fully authenticated access to the network. The mobile node receives a credential from the first base station, conditionally upon full authentication of the mobile node by the first base station. The mobile node transmits an authentication message including the credential to the second base station to request credential authentication from the second base station. The mobile node receives credential authenticated access to the network through the second base station, if the second base station verifies the credential transmitted by the mobile node.

In another implementation of the present invention, a method of providing the mobile node with credential authenticated access to the network through the second base station prior to completion of full authentication of the mobile node by the second base station is provided. A network is coupled to a first base station and the second base station. The mobile node is fully authenticated by the first base station for fully authenticated access to the network. The mobile node receives a credential from the first base station, conditionally upon full authentication of the mobile node by the first base station. The mobile node transmits an authentication message including the credential to the second base station to request credential authentication from the second base station. The mobile node receives credential authenticated access to the network for the mobile node through the second base station, if the second base station verifies the credential transmitted by the mobile node.

In yet another embodiment of the present invention, a mobile node capable of coupling to a network through a credential authenticated access is provided. The network is coupled to a first base station and a second base station. The mobile node is fully authenticated by the first base station for fully authenticated access to the network. A reception module of the mobile node receives a credential from the first base station, conditionally upon full authentication of the mobile node by the first base station. A transmission module of the mobile node transmits an authentication message including the credential to the second base station to request credential authentication from the second base station. The reception module and the transmission module participate in credential authenticated access to the network for the mobile node through the second base station, if the second base station verifies the credential transmitted by the mobile node.

These and various other features as well as other advantages, which characterize the present invention, will be apparent from a reading of the following detailed description and a review of the associated drawings.

DETAILED DESCRIPTION OF THE INVENTION

Many examples exist of a mobile node moving between the operational zones of multiple network access points or base stations. For example a mobile node may be in the form of a wireless Internet device traveling from the range a base station of one wireless tower into the range of another. In addition, moving between various media types may constitute moving between multiple operational zones. For example, a laptop computer may be coupled via a wired network connection to a network server during a meeting. After the meeting is over, the user may disconnect the laptop computer from the wired connection and re-establish network communications via a wireless connection, typically through a wireless access point coupled to the network. In such situations, the network includes one or more base stations (e.g., servers or wireless access points) for authenticating user access to the network.

To minimize the delay associated with fully re-authenticating with the network (e.g., re-authenticating with the second base station or through the wireless access point after the meeting), an additional form authenticated access mode called "credential authenticated" access is provided. The mobile unit is fully authenticated in the first base station (e.g., the user has logged in and paid for service). Thereafter, the first base unit transmits a "credential" to the mobile node that may be used by other base stations to establish trust with the mobile node prior to full re-authentication. Upon entering the operational zone of the second base station, the mobile node can transmit the credential to the second base station, which may accept the credential and allow access by the mobile node to the network through the second base station before full authentication has completed. In this manner, the mobile node user experiences minimal service latency when moving between base stations.

Figure 1:
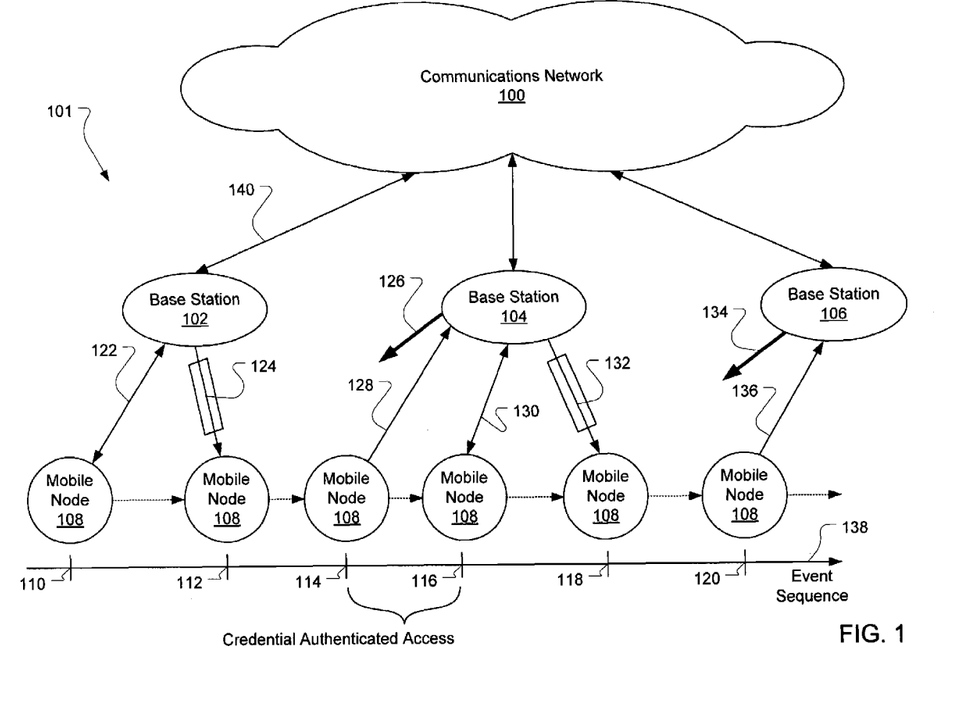
FIG. 1 illustrates mobile authentication in an embodiment of the present invention.

FIG. 1 illustrates mobile authentication in an embodiment of the present invention. A mobile access network 101 provides access to a communications network 100, such as the Internet, an Intranet, or any other data, voice, or video network. The communications network 100 may also comprise or have access to other networks (not shown) and network resources, such as other computing systems, storage systems and control systems. Various networks and resources within or accessible through the communication network 100 may be owned or operated by various organizations and business and need not be solely part of a proprietary network of one organization. In addition, various resources within the mobile access network 101 may be operated by various cooperating organizations.

Generally, a mobile node, such as a mobile phone, a wireless personal digital assistant (PDA), or a computer with wireless networking capabilities, accesses a network through geographically distributed base stations or base stations having different media types or through several networks of the same type, which may be provided for the purposes of bandwidth aggregation, increased reliability, or load balancing. In one embodiment, the mobile node includes a transmission module for transmitting messages to a network and a reception module for receiving message from the network. Such modules can also communicate with one or more base stations.

In FIG. 1, a mobile node 108 is capable of moving (as shown by the multiple representations of mobile node 108 illustrated along an event sequence line 138) relative to the geographically distributed base stations 102, 104, and 106. The mobile node 108 is represented as being within the operational zone of the base station 102 at events 110 and 112, within the operational zone of the base station 104 at events 114, 116, and 118, and within the operational zone of the base station 106 at events 108.

It should be understood, however, that the operational zones of one or more base stations may overlap. For example, in an example of base stations having different media types, a mobile node may first be connected to a communications network through a wired connection to a base station (e.g., gateway server). Thereafter, the user may disconnect the mobile node from the wired connection, at which point a wireless connection may be established through another base station to provide comparable access to the communications network. Accordingly, entering a base station's "operational zone" includes invoking a connection to a different media type. It should also be understood that the mobile node may connect to another base station without disconnecting from the previous base station. For example, the mobile node may utilize the combined bandwidth or reliability of two or more base stations simultaneously.

Each base station acts as an intermediary between one or more mobile nodes and the network. A base station may be embodied by one or more general purpose or specialized computers and may include a media access point (such as a wireless access point), a gateway router, services for authenticating access, and any other computer or service that makes the decision of allowing or denying access to the network. For example, the mobile node 108 can communicate with the base station 102 via a wireless communications link 122, although the link may also be a wired link. The base station 102 routes communications between the mobile node 108 and the communications network 100, either directly via a wired or wireless communications link 140 or indirectly through one or more other intermediaries. Base stations typically include a reception module for receiving communications from mobile nodes, an authentication for handling authentication events, and a transmission module for transmitting communications to mobile nodes.

At event 110, the mobile node 108 is within the operational zone of the base station 102 and has not previously been authenticated for access to the network 100. Therefore, to access the network, the mobile node 108 attempts a full authentication dialog 122 with the base station 102. If the full authentication operation completes successfully, the mobile node 108 is granted fully authenticated access to the communications network 100 via the base station 102, subject to whatever security policy applies to the authenticated user. This full authentication operation incurs the delay previously discussed. For example, the base station 102 or some other communicatively coupled system may access an authentication, authorization, and accounting foreign (AAAF) server to fully authenticate the user (e.g., through a login validation or an electronic or credit card payment).

At event 112, the base station 102 establishes a credential key, such as secret credential key Kcred, with the mobile node 108 by sending a credential key to the mobile node 108. (Alternatively, by receiving the credential key from the base station, the mobile node 108 can be said to establish the credential key with the base station). Exemplary methods of establishing the secret credential key with the mobile node 108 include without limitation establishing the secret credential key as part of the authentication process, by using a secure communications link 124 created during the authentication, or by executing a secret key-establishment protocol.

The base station 102 also sends a credential to the mobile node 108, but this communication need not be over a secure link. The credential may be used by the mobile node 108 to establish credential authenticated access to the network through the base station 104.

In one embodiment, the secret credential key is a secret 128 bit long random number generated by the base station 102, although the secret credential key Kcred may take other forms or may be generated by other entities within the mobile access network 101 within the scope of the present invention (see e.g., the signed and encrypted credential described below).

In addition, alternative means of establishing a credential key with the mobile node 108 may be employed. For example, the mobile node 108 may establish the credential key by transmitting a public credential key $P_{Kcred}$ to the base station 102. The link over which the public credential key is sent need not be encrypted but is authenticated in one embodiment of the present invention. The base station 102 then associates the public credential key within the credential that is sent to the mobile node 108, which sends the credential to the second base station 104 for credential authenticated access to the network. The base station 104 can then use the public credential key to authenticate the credential and grant credential authenticated network access to the mobile node 108. In such an embodiment, a public-private key pair can be used to secure and authenticate communications between the mobile node and various base stations instead of the secret credential key $K_{cred}$. Another embodiment may send a Kerberos ticket format as a credential to a mobile node.

The credential informs other entities within the mobile access network 101 (particularly other base stations) that any mobile node that knows the secret credential key Kcred (or the secret part of the public key $P_{Kcred}$) should be trusted for credential authenticated access. The credential may also define or parameterize the level of trust granted to the mobile node during credential authenticated access. For example, a mobile node may have been fully authenticated to access only a subset of the services available through the base station 102. Accordingly, the credential may indicate this limited level of trust (or provide parameters leading the base station 104 to grant only the limited level of trust) to ensure that the credential authenticated access through the base station 104 is no greater than the fully authenticated access provided through the base station 102. In addition, a policy may exist within the mobile access network 101 that credential authenticated access is always more limited that fully authenticated access. Accordingly, the corresponding credential defines a limited level of trust for credential authenticated access, which can be revised upon full authentication at the base station 104. It should be understood that the event 112 may occur concurrently with, immediately following, or at some period after the event 110 (see FIG. 2).

At the event 114, the mobile node 108 has moved into the operational zone of the base station 104, which sends a challenge 126 to the mobile node 108. In one embodiment, the challenge may be periodically broadcast to any mobile node in its operational zone. Alternatively, the base station 104 may transmit the challenge during the course of a dialog. The challenge may include an index i and a nonce $N_{challenge}$ (i.e., a random number), although other challenge formats are contemplated within the scope of the present invention. The index i represents a challenge sequence number (e.g., a 16 bit long number) that allows a response from a mobile node (see event 116) to be matched up with a specific challenge. The received nonce $N_{challenge}$ may be used by the mobile node 108 to generate a response. In one embodiment, the response is a message that includes a keyed one-way function (e.g., $f^{(1)}_{Kcred}(N_{challenge})$) although other responses are contemplated within the scope of the present invention. A keyed one-way function, for example, can be implemented by computing the value of a secure hash function of a key and a message.

Accordingly, at the event 114, the mobile node 108 transmits a response to the base station 104 through a communications link 128, responsive to one of the recent challenges from the base station 104. The response is generated by the mobile node 108 based on the credential key and the credential received from the base station 102. If the base station 104 can verify the credential and the mobile node's possession of the credential key, the base station 104 can allow credential authenticated access to the network 100. (Otherwise, the mobile node 108 must fully re-authenticate to obtain access to the network 100, thereby incurring the authentication delay associated therewith.) In the context of the description of FIG. 1, it is assumed that credential authenticated access is granted to the mobile node 108 by the base station 104.

Credential authenticated access may continue indefinitely or be terminated upon a pre-determined condition. Indefinitely continued credential authenticated access decreases the security of the network 100, but may be appropriate in some circumstances. It is generally more secure to terminate credential authenticated access in response to a pre-determined condition. One exemplary condition may include without limitation the completion of a full authentication attempt (whether successful or not). If the full authentication is successful, then credential authenticated access terminates in favor of fully authenticated access. If the full authentication is unsuccessful (possibly after multiple attempts), then credential authenticated access may be terminated, requiring full authentication for further access to the network 100. Other exemplary conditions may include without limitation a time limit, a bandwidth limit, a limit on services accessed, detection of network misuse, and loss of communications from the mobile node 108 (e.g., the mobile node 108 leaves the operating area of the base station 104 prior to full authentication). The nature of the condition may be indicated by the credential or may be maintained by the base station(s).

At the event 116, which may occur concurrently with, immediately following, or at some period after the event 114, the mobile node 108 optionally attempts to fully re-authenticate with the base station 104 through a communications link 130. It should be understood, however, that the authentication delay associated with previous approaches is not experienced by the user because credential authenticated access has already been granted between events 114 and 116. Furthermore, in some circumstances, the mobile node 108 may bypass event 116. For example, the mobile node 108 may exit the operational zone of the base station 104 prior to beginning a full authentication attempt.

At the event 118, the base station 104 establishes a credential key with the mobile node 108 and sends a credential to the mobile node 108, as described with regard to the event 112. In one embodiment, the keys may be the same keys as transmitted in event 112, although the keys transmitted by each base station may be different in alternative embodiments of the present invention. It should be understood that the order of events 116 and 118 may be reversed or otherwise altered, depending on the design of the protocol, without departing from the present invention.

At the event 120, the mobile node 108 has moved into the operational zone of the base station 106, which sends a challenge 134 as discussed with regard to the challenge 126. Responsive to the challenge 126, the mobile node 108 responds with a credential, such as the credential received during event 118. Alternatively, the mobile node 108 may reuse the first credential received during the event 112, so long as the base station 106 considers the first credential valid (which depends on the trust parameters of the credential and the security policies of the mobile access network). Accordingly, at the event 120, the mobile node 108 transmits a response to the base station 106 through a communications link 136. If the base station 106 can verify the credential key and credential, the base station 106 can allow credential authenticated access to the network 100.

Figure 2:
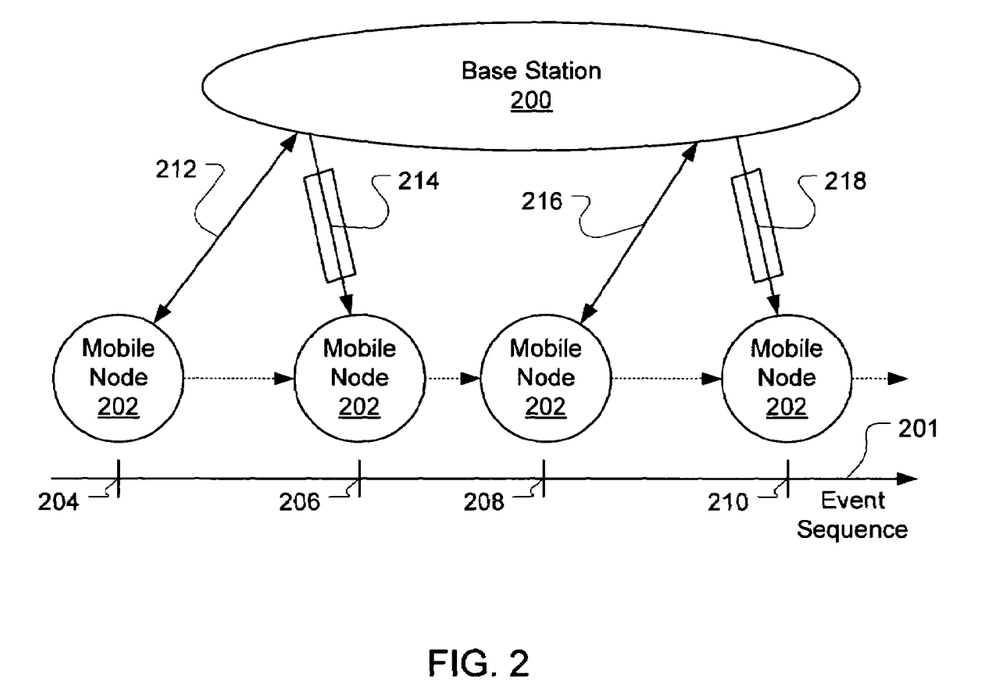
FIG. 2 depicts a base station issuing multiple credentials to a mobile node in an embodiment of the present invention.

FIG. 2 depicts a base station 200 issuing multiple credentials to a mobile node 202 in an embodiment of the present invention. While FIG. 1 illustrates a single base station issuing a single credential to a mobile node, it should be understood that a single base station may issue multiple credentials to the same mobile node during a single communication session.

The mobile node 202 is capable of moving (as shown by the multiple representations of mobile node 202 illustrated along an event sequence line 201) relative to the geographically distributed base stations. The mobile node 202 may have achieved changing (e.g., decreasing or escalating) levels of authentication through multiple authentication operations during its interaction with the base station 200. Multiple authentication operations may occur, for example, as the mobile node 202 accesses different levels of services during its communications with the base station 200. As such, the mobile node 202 may have been fully authenticated for a subset of services during the event 204. At an event 206, the base station 200 establishes a credential key with the mobile node 202 and sends a first credential to the mobile node 202 authorizing credential authenticated access to the subset of services.

Thereafter, at some period after the event 204 (i.e., at an event 208), the mobile node 202 is fully authenticated again to access additional services through the base station 200. Accordingly, at an event 210, which follows the second full authentication operation, the base station 200 provides a second credential representing the level of access granted during the second full authentication operation. The second credential may supersede or supplement the level of trust associated with the first credential. Alternatively, the events 204 and 208 may be first stages in a multi-stage authentication or payment process, in which the mobile node 202 receives increasing levels of access after each stage. The keys established with the mobile node 202 in events 206 and 210 may be the same keys or they may be different keys.

It should also be understood that multiple credentials, each issued by a separate base station, may be combined to provide escalating credential authenticated access to the network. For example, referring to FIG. 1, credentials received by the mobile node 108 from the base stations 102 and 104 may be retained by the mobile node 108 and submitted to the base station 106 to receive credential authenticated access. The base station 106 may then apply a predefined policy to determine the appropriate level of trust to be allocated to the mobile node 108, based on the combined credentials, during the period of credential authenticated access.

In an alternative embodiment, the first and second base stations may be the same base station at different points in time. For example, the mobile node 108 has fully authenticated with the base station 102 and has received a credential from the base station 102. However, during the course of the communications between the mobile node 108 and the base station 102, a detector module in the mobile node detects that communications have been terminated, such as by temporary departure of the mobile node from the operational area of the base station 102, electromagnetic interference or shielding on a wireless connection, or a loss of power by either the base station or the mobile node. Before the communications are re-established, the base station 102 may expire the authentication of the mobile node 108 in accordance with a security policy. If the mobile node 108 can re-establish its connection with the base station 102 and submit the credential to the base station 102, the mobile node 108 may gain credential authenticated access through the base station 102, without experiencing the delay originating from full authentication. Thereafter, the mobile node 108 may fully authenticate with the base station 102.

Figure 3:
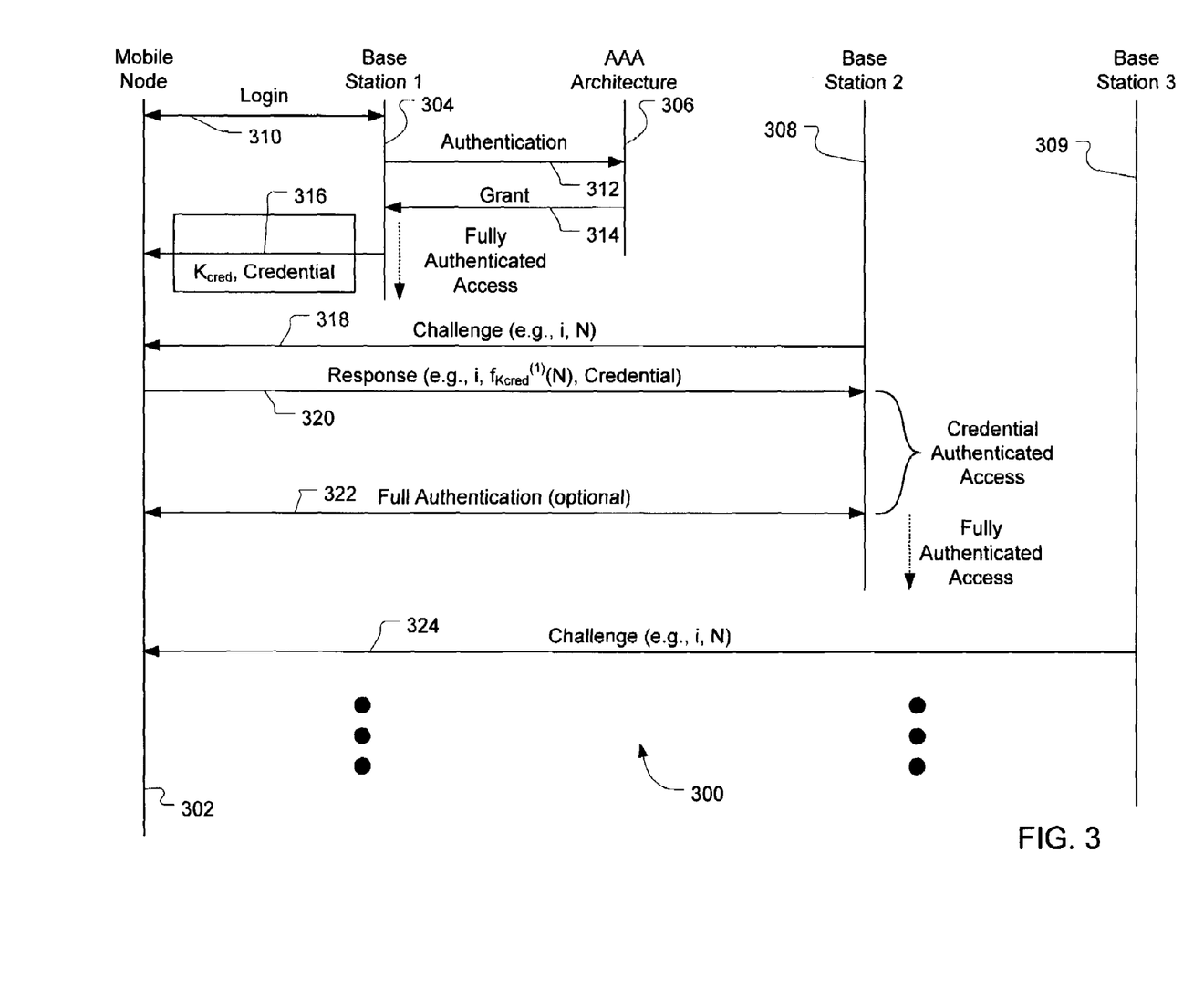
FIG. 3 illustrates communications among entities of a mobile access network in an embodiment of the present invention.

FIG. 3 illustrates communications among entities of a mobile access network in an embodiment of the present invention. The vertical line 310 represents a mobile node in a mobile access network, such as the mobile node 108. The vertical lines 306, 308, and 309 represents three base stations in the mobile access network (i.e., base station 1, base station 2, and base station 3, respectively). The vertical line 306 represents one or more AAAF (Authentication Authorization and Accounting Foreign) servers and other elements of the AAA architecture (collectively, an "AAA architecture").

Various horizontal lines represent communications between entities in the mobile access network. For example, a communication 310 represents a login dialog between the mobile node and the base station 1. The login dialog is directed to provide fully authenticated access to the network. Responsive the login dialog, a communication 312 represents an authentication request between the base station 1 and the AAA architecture. A communication 314 represents a grant of access indicated by the AAA architecture to the base station 1. It should be understood that the full authentication protocol represented in FIG. 3 is merely exemplary and alternative full authentication protocols are contemplated within the present invention, such as IPSec (Internet Protocol Security) authentication or authorized electronic or credit card payment.

Responsive to the grant received in the communication 314, the base station 1 allows the mobile node to have fully authenticated access to the network. The base station 1 establishes a credential key with the mobile node in a secure communication 316 and also sends a credential to the mobile node, responsive to the fully authenticated access by the base station 1. In alternative embodiments, it is possible to issue the credential without full authentication, depending upon the security policies of the mobile access network. In addition, while it is assumed for the description of FIG. 3 that the full authentication dialog between the mobile node and the base station 1 results in a grant of access, it should be understood that full authentication may fail and that the key and credential may therefore be withheld from the mobile node.

As the mobile node moves into the operational zone of the base station 2, the mobile node receives a challenge 318, which is broadcast or otherwise transmitted by the base station 2. A communication 318 represents a response to the challenge from the mobile node, which attempts to establish credential authenticated access to the network through base station 2.

Responsive to the receipt of the response from the mobile node, the base station 2 verifies that the credential is authentic and verifies the mobile node's possession of the credential key, after which the base station 2 may allow some level of access by the mobile node to the network (i.e., credential authenticated access). A communication 322 represents a full authentication dialog between the mobile node and the base station 2. In addition, a communication 324 represents a challenge from base station 3 as the mobile node moves into the operational zone of the base station 3.

The credential authentication protocol and the form of the credential keys, credentials, challenges, responses, and full authentication dialogs can vary substantially. Three exemplary forms are described below employing a secret credential key; however, the present invention is not limited to the embodiments described herein.

In a first embodiment, the credential may be implemented as a signed and encrypted message that contains the secret credential key $K_{cred}$ and binds the key to the level of trust that the mobile node should be granted during credential authenticated access:

Credential=$E_{Knet}(S_{Knet}(K_{cred}, \text{trust parameters}))$ wherein $E_{Knet}$ represents an encryption function based on a shared key $K_{net}$; S represents a signature function (a type of authentication code) based on $K_{net}$; and the signed and encrypted message contains the secret credential key $K_{cred}$ and trust parameters. The shared key $K_{net}$ is shared by multiple (or all) base stations in the mobile access network or a number of cooperating mobile access networks, and, therefore, each base station can use $K_{net}$ to decrypt the response from the mobile node and to verify the signature in the credential. Note that in alternative embodiments, public key encryption and signatures may be employed in a similar fashion.

In this embodiment, the secret credential key $K_{cred}$ is encrypted within the credential. This cryptographic association between the secret credential key and the credential prevents modification of the credential by the mobile node. The trust parameters specify any information about the mobile nodes that base station 1 wishes to pass on to base station 2 (or any other base station). Exemplary trust parameters may include without limitation the date and time of the previous full authentication or payment, the amount of total previous payments, or a credit rating associated with the mobile node. Alternatively, exemplary trust parameters could specify an expiration time or provide direction instructions about an allowed level of access or trust, although such strict trust parameters withhold much of the control of access from the base station 2 and may not be timely. That is, the base station 2 may have received updated information relating to authentication of mobile nodes (e.g., current revocation lists or a current fraud rate) and, therefore, should generally be permitted to make the final access determination based on past behavior of the mobile node and the base station's most current security policies. (A revocation list may include updated parameters or instructions for denying credential authenticated access to the network based on various inputs, such as system-wide security policy changes.) The trust parameters may also be implied by the format of the credential, by the time and circumstances in which the credential is used, or by the key that is used for authenticating the credential. When trust parameters are implied, the trust parameters are implicitly included in the credential, even though they may not be explicitly specified. It should be understood that the secret credential key $K_{cred}$ is also sent to the mobile node, via a secure communications link.

After receiving the signed and encrypted credential of the first embodiment, the mobile node merely passes the credential on in a response to another base station through which the mobile node wishes to access the network. The new base station uses the shared key $K_{net}$ to decrypt the message and verify the signature.

Therefore, in summary of the protocol in the first embodiment, relevant communications involving the mobile node include the following, relative to the communications in FIG. 3:

(1) Communication 316 from base station 1 to the mobile node:

$K_{cred}$, $E_{Knet}(S_{Knet}(K_{cred}, \text{trust parameters}))$

Note that $K_{cred}$ is sent through a secure communications link.

(2) (Challenge) Transmit communication 318 from the base station 2 includes i and $N_{challenge}$ (3) (Response) Communication 320 from the mobile node to the base station 2:

i, $f^{(1)}_{Kcred}(N_{challenge})$ $E_{Knet}(S_{Knet}(K_{cred}, \text{trust parameters}))$ The base station 2 compares the index i to confirm that the response corresponds with a recent challenge and decrypts the received credential using $K_{net}$ to yield a signed pair of a decrypted $K_{cred}$ and the trust parameters. The base station then verifies the signature using its own instance of $K_{net}$. If the signature is not verified, credential authenticated access is not granted.

In addition, the base station 2 determines the $N_{challenge}$ that corresponds with the response by looking up the appropriate $N_{challenge}$ from a table of recently issued challenges using the received i as a look-up key. The base station 2 then computes $f^{(1)}_{Kcred}(N_{challenge})$ using its own instances of $N_{challenge}$ and the decrypted $K_{cred}$ and compares the computed $f^{(1)}_{Kcred}(N_{challenge})$ result to the received $f^{(1)}_{Kcred}(N_{challenge})$ result from the mobile node to verify the received $K_{cred}$. If the results match, then the received $K_{cred}$ is verified and the base station may trust the trust parameters received in the response. The base station 2 and the mobile node may continue to use the $K_{cred}$ as the session key to secure further communications between them.

As described in the first embodiment, the signature and encryption on the credential are created and read only by the base stations in the mobile access network. The mobile node need not decrypt the credential or verify the signature in order to gain credential authenticated access to the network. Accordingly, in a second embodiment, it is sufficient to use a symmetric cipher $E_K$ for the encryption and a keyed one-way function $f^{(2)}_{Knet}$ in place of the signature. Accordingly, in the second embodiment, the unsigned and encrypted credential can take the form:

Credential=$E_{Knet}(K_{cred}$, trust parameters, $f^{(2)}_{Knet}(K_{cred}$, trust parameters))

where $K_{net}$ is the secret key that is shared by the base stations, $K_{cred}$ is the secret credential key received by the mobile node from the base station in association with the credential, and the keyed one-way function $f^{(2)}_{Knet}$ replaces the keyed signature of the first embodiment. This cryptographic association between the secret credential key and the credential prevents undetected modification of the credential by the mobile node.

Therefore, in summary of the protocol in the second embodiment, relevant communications involving the mobile node include the following, relative to the communications in FIG. 3:

(1) Communication 316 from base station 1 to the mobile node:

$K_{cred}$, $E_{Knet}(K_{cred}$, trust parameters, $f^{(2)}_{Knet}(K_{cred}$, trust parameters))

Note that Kcred is sent through a secure communications link.

(2) (Challenge) Transmit communication 318 from the base station 2 includes i and $N_{challenge}$ (3) (Response) Communication 320 from the mobile node to the base station 2:

i, $f^{(1)}_{Kcred}(N_{challenge})$,$E_{Knet}(K_{cred}$, trust parameters, $f^{(2)}_{Knet}(K_{cred}$, trust parameters))

The base station 2 compares the index i to confirm that the response corresponds with a recent challenge and decrypts the credential using $K_{net}$ to yield a decrypted $K_{cred}$, the trust parameters, and the keyed one-way function result of $f^{(2)}_{Knet}(K_{cred}$, trust parameters). The base station then computes $f^{(2)}_{Knet}(K_{cred}$, trust parameters) itself using its own instance of $K_{net}$ and the trust parameters and the decrypted $K_{cred}$. The base station 2 compares its computed result $f^{(2)}_{Knet}(\,)$ with the decrypted $f^{(2)}_{Knet}(\,)$ result from the mobile node. If the results match, then the base station may trust the trust parameters received in the response if the received result of $f^{(1)}_{Kcred}(N_{challenge})$ can be verified.

To verify the received result of $f^{(1)}_{Kcred}(N_{challenge})$, the base station 2 determines the $N_{challenge}$ that corresponds with the response by looking up the appropriate $N_{challenge}$ from a table of recently issued challenges using the received i as a look-up key. The base station 2 then computes $f^{(1)}_{Kcred}(N_{challenge})$ using its own instances of $N_{challenge}$ and the decrypted $K_{cred}$ and compares the computed $f^{(1)}_{Kcred}(N_{challenge})$ result to the received $K_{cred}(N_{challenge})$ result from the mobile node to verify the received $K_{cred}$. If the results match, then the received $K_{cred}$ is verified and the base station may trust the trust parameters received in the response. The base station 2 and the mobile node may continue to use the $K_{cred}$ as the session key to secure further communications between them.

However, in yet a third embodiment, keyed one-way functions can be employed to eliminate the encryption of the credential altogether. In other words, different keyed one-way functions can be used to generate the new secret credential key $K_{cred}$ and the response to the challenge to provide a complete and secure protocol without encryption of the credential.

To generate the secret credential key $K_{cred}$, a keyed one-way function $f^{(3)}_{Knet}(\,)$ is used in combination with a nonce $N_{BS1}$, which need not be secret:

$$K_{cred}=f^{(3)}_{Knet}(N_{BS1})$$

where $K_{net}$ is the shared key that is shared by the base stations, $K_{cred}$ is the secret credential key received by the mobile node from the base station in association with the credential, and $N_{BS1}$ is the nonce generated by base station 1. The credential key $K_{cred}$, the nonce $N_{BS1}$, and the keyed one-way function $f^{(2)}_{Knet}(N_{BS1}$, trust parameters) are transmitted by the base station to the mobile node, wherein the credential key is transmitted via a secure communications link. This cryptographic association between the secret credential key and the credential prevents undetected modification of the credential by the mobile node.

Based on these values and another keyed one-way function result $f^{(1)}_{Kcred}(N_{challenge})$ computed by the mobile node, a second base station can verify that the trust parameters are to be trusted when received from the mobile node. Accordingly, the nonce $N_{BS1}$, the trust parameters, and the result of the one-way function $f^{(2)}$ can be transmitted from the base station to the mobile node without encryption:

Credential=$N_{BS1}$, trust parameters, $f^{(2)}_{Knet}(N_{BS1}$, trust parameters)

Therefore, in summary of the protocol in the third embodiment, relevant communications involving the mobile node include the following, relative to the communications in FIG. 3:

(1) Communication 316 from base station 1 to the mobile node:

$K_{cred}$, $N_{BS1}$, trust parameters, $f^{(2)}_{Knet}(N_{BS1}$, trust parameters)

where $K_{cred}=f^{(3)}_{Knet}(N_{BS1})$ and is sent through a secure communications link.

(2) (Challenge) Transmit communication 318 from the base station 2 includes i and $N_{challenge}$ (3) (Response) Communication 320 from the mobile node to the base station 2:

$f^{(1)}_{Kcred}(N_{challenge})$, $N_{BS1}$, trust parameters, $f^{(2)}_{Knet}(N_{BS1}$, trust parameters), i The base station 2 compares the index i to confirm that the response corresponds with a recent challenge. The base station 2 also computes the secret credential key $K_{cred}=f^{(3)}_{Knet}(N_{BS1})$, using its own instance of $K_{net}$ and the received instance of $N_{BS1}$.

The base station 2 determines the $N_{challenge}$ that corresponds with the response by looking up the appropriate $N_{challenge}$ from a table of recently issued challenges using the received i as a look-up key. The base station 2 then computes $f^{(2)}_{Knet}(N_{BS1}$, trust parameters) using its own instance of $K_{net}$, the nonce $N_{BS1}$, and the received trust parameters and compares the result to the result received from the mobile node to verify the trust parameters. If the results match, then base station 2 knows that the trust parameters are associated with the credential key $K_{cred}$, i.e. it may trust anyone who is in possession of $K_{cred}$ to the extent indicated by the trust parameters.

The base station 2 then computes $f^{(1)}_{Kcred}(N_{challenge})$ using its own instance of $N_{challenge}$ and the decrypted $K_{cred}$ and compares the computed result to the result received from the mobile node to verify the received $N_{BS1}$. If the results match, then the base station knows that the trust parameters are associated with the particular mobile, i.e. it may trust the mobile to the extent indicated by the trust parameters.

Trust parameters tend to record facts about the mobile node's previous network access, rather than instructions directed to the new base station (although alternative embodiments may include such instructions). The new base station (e.g., base station 2) uses the trust parameters in the credential, possibly with other information available to the base station, as its basis for determining how much it will trust the mobile node before the base station has fully authenticated the node. Exemplary other information may include without limitation revocation lists and observed fraud rates.

In one embodiment, only positive information regarding a mobile node's level of trust is stated in the trust parameters. In this manner, the default level of access without any credential in a minimal level of access (e.g., no access), which increases based on the trust parameters received from the previous base station through the mobile node. For example, it is possible for a credential to indicate limited access for a mobile node (as opposed to no access), but not to override or further constrain any previously issued credentials for the mobile node. However, in alternative embodiments, trust parameters may decrease the current level of trust, if appropriate.

Base station 2 may also take into account other information available to it when making its decision to grant credential authenticated access to a mobile node. Exemplary information may include without limitation revocation lists and a current fraud rate value. For example, a base station 2 could choose to ignore all credentials that are more than 10 seconds old, based on an issue time value included in the credentials, regardless of their other contents.

Global identifiers may be used to identify misuse of the mobile access network, particularly the distribution of the credential and secret credential key to other mobile nodes. The trust parameters do not need to contain any information that identifies the mobile node, but such information may be included if desired by the mobile access network. If a mobile node identifier is included in the credential, it may be encrypted with a shared key (e.g., $K_{net}$) and a random initialization vector (e.g., $N_{BS1}$) so that the mobile node identifier is not revealed to outside listeners. Knowing the mobile node identifier may allow corrective action can be taken against both the fully authenticated mobile node (which distributed its credential and secret credential key) and the imitating mobile node (by terminating access). Furthermore, detection of such misuse may trigger a reconfiguration of the mobile access network (e.g., a change of the shared key $K_{net}$ or revocation of all credentials issued prior to a specified time).

Exemplary types of global identifier contemplated within the present invention are a home IP (Internet Protocol) address, which is used to identify mobile IP nodes, a Media Access Controller (MAC) address, which is associated with the mobile node's network controller, or a GSM IMSI (Global System for Mobile telecommunications International Mobile Subscriber Identifier). Such identifiers may be inserted as arguments to the keyed one-way functions $f^{(1)}$ and $f^{(4)}$ and may be included in the credential. It should be understood that movement of the mobile node between disparate media types (i.e., wired link to wireless link) may introduce multiple global identifiers to the credential.

Alternatively, the mobile node identifier may be omitted to simplify the protocol. Accordingly, in another embodiment, the mobile access network may log the nonces (e.g., $N_{BS1}$) issued by base stations to mobile nodes in correspondence with related identity or payment information. In this manner, after the mobile node gains credential authenticated access to a new base station, the nonce received from the mobile node may be analyzed to detect misuse or fraud (e.g., distributing the credential to other mobile nodes).

A credential is also usually stamped with the time of its issue or the time of its full authentication. Such a time stamp can be compared to a credential expiration threshold maintained by the network. If the credential time stamp is too old, the base station may reject it.

In response to receipt and verification of a credential received from a mobile node, a base station makes judgments regarding access based on the facts in the certificate and on other information available to the base station at the time of the credential authentication attempt. In this manner, the network operator may dynamically adjust authentication policies, such as the credential expiration threshold, so as to obtain a desirable balance between efficiency and security. The shared key $K_{net}$ may be modified at any time, effectively requiring full authentication of all mobile nodes as they pass to a new base station. This approach allows the network operator to react to security breaches without waiting for credentials to expire. In one embodiment, the delay associated with requiring full authentication may be mitigated by accepting both the new shared key and the old shared key for a short period of time.

Also, some parts of a mobile access network may have stricter policies on user authentication and advance payment than others, depending on the value of the available services in those parts of the network and the finance risk involved. For example, network areas with premium rates or high occurrence of fraud may honor only credentials that show recent payment at a local base station.

The key management can be strengthened by generating a new secret session key $K_{session}$ from $K_{cred}$ and the nonce $N_{challenge}$ for each credential authenticated session between the mobile node and a base station:

$$K_{session} = f^{(4)}{}_{Kcred}(N_{challenge})$$

The session key $K_{session}$ may be used in secure communications between the mobile node and the base station after credential authentication is completed. This approach adds security at the cost of additional computation by both the mobile node and the base station.

The various keyed one-way functions (e.g., $f^{(1)}$, $f^{(2)}$, $f^{(3)}$, and $f^{(4)}$) employed in embodiments of the present invention are preferably different and independent from one another. One way of implementing such a function is the compute a secure hash algorithm (SHA) (e.g., $f^{(i)}{}_K(x) = SHA(i, K, x)$).

Further parameter, such as a base station identifier, a MAC (Media Access Controller) address and a random number generated by the mobile node may be included as arguments to $f^{(1)}$ to strengthen it against forwarding and denial-of-service attacks. Moreover, if the mobile node and the base stations have accurate clocks or a secure mechanism for synchronizing their clocks to generated a synchronized clock set, the random challenge $N_{challenge}$ may be replaced by a challenge time, in which case the challenge time value need not be sent from base station 2 to the mobile node.

In addition, the implementation of functions are known by the cooperating base stations in the mobile access network, and the implementations of $f^{(1)}$ and $f^{(4)}$ are known by all mobile nodes attempting credential authenticated access through the mobile access network. Accordingly, it should be understood that the implementation of $f^{(2)}$ and $f^{(3)}$ may be changed at any time by the mobile access network administrator for security and performance optimization purposes.

Figure 4:
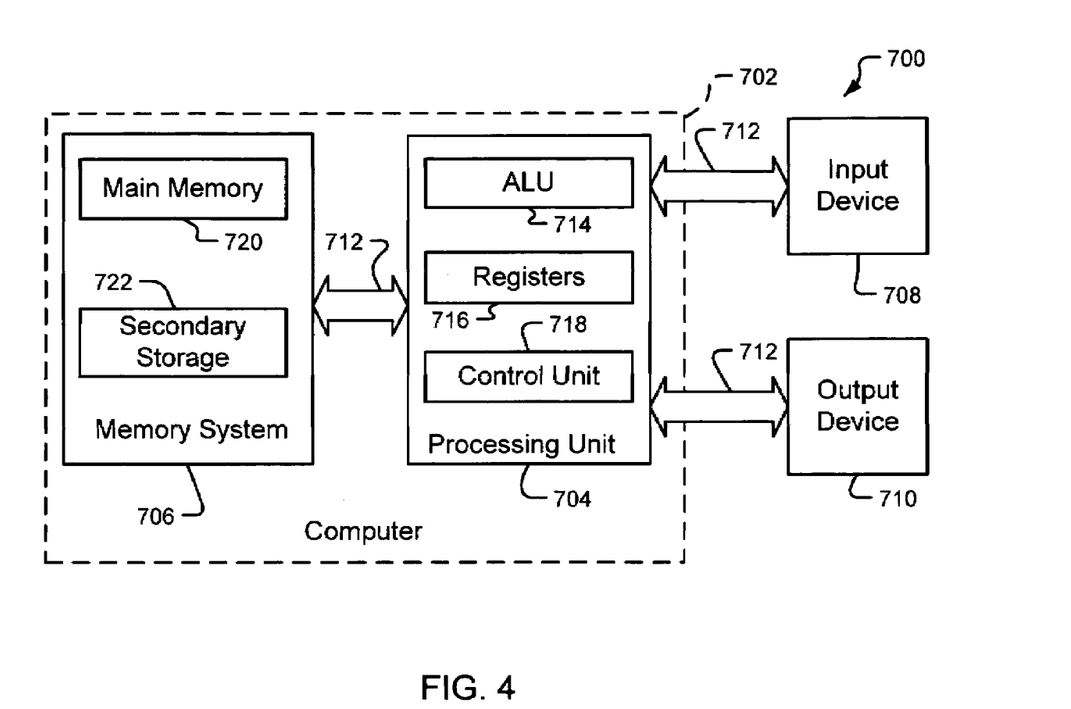
FIG. 4 illustrates an exemplary computing system useful for implementing an embodiment of the present invention.

With reference to FIG. 4, an exemplary system for implementing the invention includes a computing device, such as computing device 400. In its most basic configuration, computing device 400 typically includes at least one processing unit 404 and memory 406. In the illustrated embodiment, the exemplary processing unit 404 includes a control unit 418, registers 416, and an arithmetic logic unit 414. Such configuration may be embodied in a general purpose computer, a specialized computer, or a compact devices, such as a cell phone or wireless personal digital assistant.

A basic memory configuration is illustrated in FIG. 4 by a memory system 406. Depending on the exact configuration and type of computing device 400, main memory 420 may be volatile (such as RAM), non-volatile (such as ROM, flash memory, etc.) or some combination of the two. Additionally, device 400 may also include additional storage (removable and/or non-removable) including, but not limited to, magnetic or optical disks or tape. Such additional storage is illustrated in FIG. 4 by secondary storage 422. Computer storage media includes volatile and nonvolatile, removable and non-removable media implemented in any method or technology for storage of information such as computer readable instructions, data structures, program modules or other data. Memory 406, including main memory 420 and secondary storage 422 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 400. Any such computer storage media may be part of device 400.

Device 400 may also contain communications connection(s) 412 that allow the device to communicate with other devices. Communications connection(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF (radio frequency), infrared and other wireless media. The term computer readable media as used herein includes both storage media and communication media.

Device 400 may also have input device(s) 408 such as keyboard, mouse, pen, voice input device, touch input device, etc. Output device(s) 410 such as a display, speakers, printer, external network devices, etc. may also be included. All these devices are well known in the art and need not be discussed at length here.

Devices, such as personal digital assistants, web tablets, and mobile communication devices (e.g., mobile phones), are examples of devices in which the present invention is directed. However, other computer platforms, including desktop computers, server computers, supercomputers, workstations, dedicated controllers, and other computing devices are contemplated within the scope of the present invention. Furthermore, server and client processes may operate within a single computing device, so that multiple computers are not required within the scope of the present invention. Moreover, in a configuration utilizing multiple computing devices, connections between the devices may include wired connections, wireless connections, or combinations of both.

In an embodiment of the present invention, aspects of the authentication software, including decryption algorithms, security policies, keyed one-way functions, and communications functionality, may be incorporated as part of an operating system, application programs, or other program modules that are storable in memory 406 of a base station, a mobile node, or other entities in a mobile access network. Such functionality may be executed or accessed via processing unit 404. A credentials, security policy data, and keys or may be stored as data in memory 406.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. One or more computer-storage media embodying processor-executable instructions that, when executed by a processor, implement a method on a mobile node comprising:

receiving a credential and a credential key from a first base station operably connected to a communications network;

receiving a challenge from a second base station operably connected to the communications network;

in response to the challenge, transmitting to the second base station a response constructed using the credential and the credential key;

gaining a credential authenticated access level to the communications network via the second base station conditional on the second base station authenticating the credential, wherein the credential authenticated access level provides the mobile node access to the communications network prior to fully authenticating the mobile node; and gaining a fully authenticated access level to the communications network via the second base station conditional on the second base station fully authenticating the mobile node, wherein the credential authenticated access level to the communications network is terminated if the second base station fails to fully authenticate the mobile node.

2. The one or more computer-storage media of claim 1, wherein the credential key is received via a secure communications link.

3. The one or more computer-storage media of claim 1, wherein the credential key is a public key of a public-key crypto system.

4. The one or more computer-storage media of claim 1, wherein the credential key and the credential are received via communications links having different levels of security.

5. The one or more computer-storage media of claim 1, wherein the credential defines the credential authenticated access level.

6. The one or more computer-storage media of claim 1, wherein the response includes a keyed one-way function.

7. The one or more computer-storage media of claim 1, wherein the credential authenticated access level to the communications network is terminated upon the occurrence of a pre-determined condition that is specified in the credential.

8. The one or more computer-storage media of claim 1, wherein the credential is encrypted.

9. The one or more computer-storage media of claim 1, wherein the credential comprises an encrypted message including the credential key.

10. The one or more computer-storage media of claim 1, wherein fully authenticating the mobile node comprises full authenticating a user of the mobile node.

11. The one or more computer-storage media of claim 1, wherein the credential key is a public key of a public-key cryptosystem and the credential includes data for authenticating the credential key.

12. A method comprising:
    issuing a challenge to a mobile node from a base station;
    receiving, at the base station, from the mobile node a response constructed using a credential and a credential key;
    granting the mobile node a first level of access to a network conditional on authentication of the credential by the base station, wherein the first level of access provides the mobile node access to the network prior to a full authentication of the mobile node by the base station; and
    granting the mobile node a second level of access to the network conditional on the full authentication of the mobile node by the base station, wherein the first level of access to the network is terminated by the base station if the mobile node fails the full authentication by the base station.

13. The method of claim 12, wherein the credential key is received via a secure communications link.

14. The method of claim 12, wherein the credential key is received via a secure communications link and the credential is received via an unsecured communications link.

15. The method of claim 12, wherein the credential defines the first level of access.

16. The method of claim 12, wherein the first level of access to the network is terminated upon the occurrence of a pre-determined condition that is specified in the credential.

17. The method of claim 12, wherein fully authenticating the mobile node comprises fully authenticating a user of the mobile node.

18. The one or more computer-storage media of claim 1, wherein failure to fully authenticate the mobile node includes failure to fully authenticate the mobile node after at least one of: two or more attempts to fully authenticate the mobile node, a full authentication time limit is exceeded, and a bandwidth limitation is exceeded.

19. The one or more computer-storage media of claim 1, wherein the credential authenticated access level provides less access to the communications network than the fully authenticated access level.

20. The method of claim 12, wherein failure of the full authentication includes failure of the full authentication after at least one of: two or more attempts to fully authenticate the mobile node, a full authentication time limit is exceeded, and a bandwidth limitation is exceeded.

21. The method of claim 12, wherein the first level of access provides less access to the network than the second level of access.

* * * * *